No. 651,897. Patented June 19, 1900.
C. STOOLFIRE.
WIRE STRETCHER AND REEL CARRIER.
(Application filed Nov. 21, 1899.)

(No Model.)

Witnesses:
Geo. E. Frech.
R. P. Herrick.

Inventor:
Charles Stoolfire,
by Collamer & Co.,
Attorneys

UNITED STATES PATENT OFFICE.

CHARLES STOOLFIRE, OF MULHALL, OKLAHOMA TERRITORY.

WIRE-STRETCHER AND REEL-CARRIER.

SPECIFICATION forming part of Letters Patent No. 651,897, dated June 19, 1900.

Application filed November 21, 1899. Serial No. 737,790. (No model.)

*To all whom it may concern:*

Be it known that I, CHARLES STOOLFIRE, a citizen of the United States, and a resident of Mulhall, Logan county, Oklahoma Territory, have invented certain new and useful Improvements in Wire-Stretchers and Reel-Carriers; and my preferred manner of carrying out the invention is set forth in the following full, clear, and exact description, terminating with claims particularly specifying the novelty.

This invention relates to wire fences, and more especially to the stretchers and reel-carriers used in connection therewith; and the object of the same is to produce a single tool having several useful functions.

To this end the invention consists in a so-called pair of "tongs" or "pincers," one member of which supports the reel and both of which are capable of producing tension on the unwinding wire to a degree dependent upon the will of the operator, all as more fully hereinafter described and claimed and as illustrated in the accompanying drawings, wherein—

Figure 1:
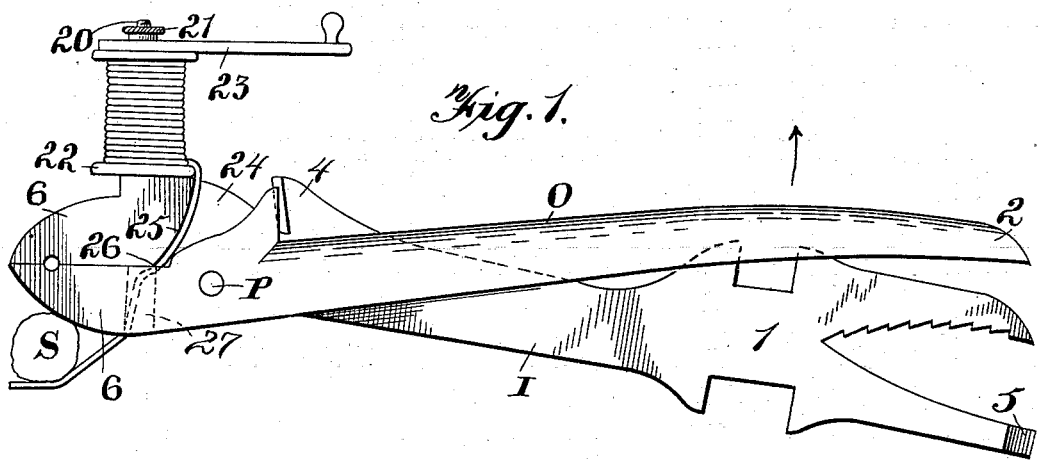
Figure 2:
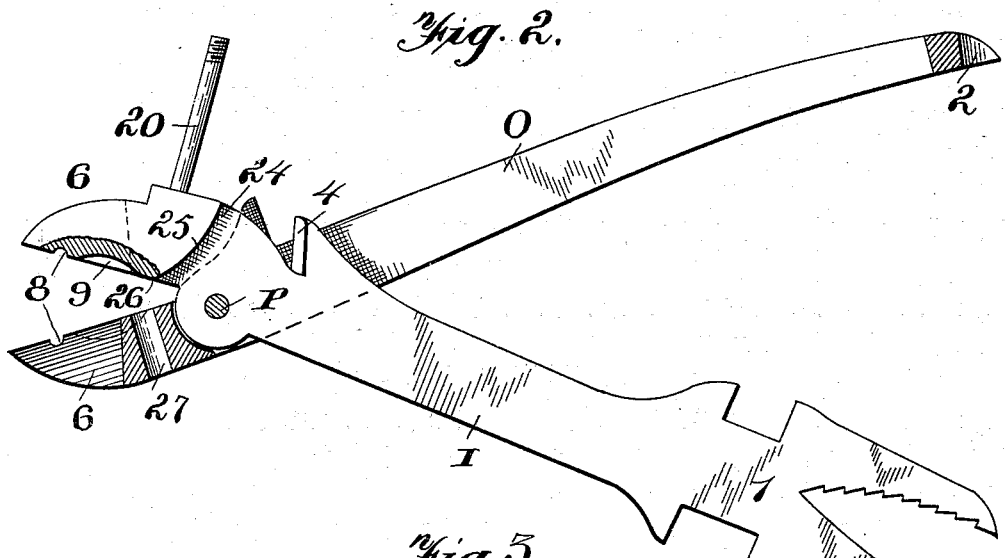
Figure 3:
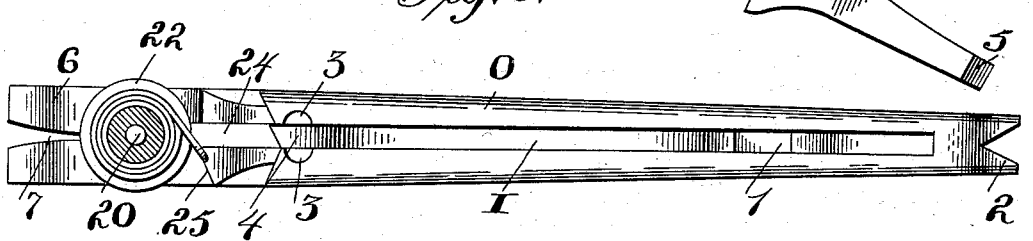

Figure 1 is a plan view of the device in use, the arrow showing the direction of movement which is necessary to tighten the wire. Fig. 2 is a similar view, partly in section, with the members of the tool open and the reel removed. Fig. 3 is an upper edge view.

The tool shown in the accompanying drawings comprises a pair of so-called "tongs" consisting of an outer member O, whose handle is slotted for the reception of an inner member I, the two being pivoted where they cross, as at P. However, so long as the members cross and are pivoted they might lie side by side (provided their operative ends or jaws were properly shaped) and no departure from the present invention would be necessary. In the present instance these members are also shown as having wrenches at 1, one arm of which may have a screw-driver 5, a claw at 2 for pulling nails, a staple-former at 3, and a wire-cutter at 4, and the jaws 6 preferably, although not necessarily, have deep alined notches 7 extending from the outer ends inward, alongside of which they have parallel cavities 9, and their meeting faces also have transverse notches 8. All of the details thus far described are unimportant, save that they form useful parts of the wire-stretching tool.

Coming now more particularly to the present invention, 20 is a spindle projecting outward from the back of one jaw and having a thumb-nut 21 screwed onto its outer end, and 22 is the reel, preferably having a crank-handle 23. If the reel is mounted on the upper jaw, as seen in Fig. 1, one side of this jaw is cut out, as at 24, and has a curved face 25 leading from the rear of the reel downward to the point 26 between the meeting faces of the jaws, while the other jaw 6 has through its body a hole 27, so located that it does not quite register with the point 26 when the jaws are closed. The result is that when closed the jaws kink the wire between the point 26 and the inner end of the hole, and as the jaws are opened more and more the hole is removed from the point and less and less tension is imparted to the wire. The latter obviously leads from the reel rearward and downward around the face 25, across the point 26, and out through the hole 27.

The use of tools of this character is too well known to need an elaborate description here. The wire is reeled by means of the handle 23, and tension can be applied, when desired, by the nut 21. The wire is unreeled in an obvious manner, and the reel is removed and replaced at times, as will be clear. Having paid out a length of wire, the operator has but to close the members together to impart more or less tension to the wire or to bring the faces of the jaws tightly together to kink the wire and prevent its slipping at all. The tool may then be placed against a post or stake, as indicated at S in Fig. 1, and the other end moved in the direction of the arrow, so as to stretch the wire and tighten it. It can, in fact, be carried completely around the stake S, if desired, by opening the members slightly, so as to permit the wire to slide under some considerable tension, as may be necessary. After fastening the stretched wire it may be cut off and twisted or otherwise treated by the independent parts of this tool or by other tools.

The exact size, proportion, and materials are not essential, and I do not limit myself to details excepting as set forth below.

What is claimed as new is—

1. A fence-wire stretcher consisting of a pair of tongs comprising an outer member slotted for the reception of an inner member and a pivot between the members where they cross, one member being cut away at one side and having a curved face leading to a point on the face of its jaw, and the other member having a hole through its jaw whose inner end is out of register with said point; when the jaws are closed together, as and for the purpose set forth.

2. A fence-wire stretcher and reel-carrier consisting of a pair of tongs whose members are pivoted where they cross, a support for the wire-reel on one member, and guides on both members for the wire, the inner ends of said guides being out of strict alinement when the jaws of the tool are closed, all as and for the purpose described.

3. A fence-wire stretcher and reel-carrier consisting of two pivoted members, a spindle projecting outward from the back of one member for receiving the wire-reel, a thumb-nut on the outer end of the spindle for imparting tension to said reel, and an independent tension device carried by the jaws and regulated by their approximation, said tension device consisting of wire-guides in the jaws with their inner ends out of true register, as and for the purpose described.

4. A fence-wire stretcher and reel-carrier consisting of a pair of tongs comprising an outer member slotted for the reception of an inner member and a pivot between the members where they cross, one member being cut away and having a curved face leading to a point on the face of its jaw, and the other member having a hole through its jaw whose inner end is out of register with said point; combined with a reel-support carried by the back of the member which has the curved face, and an independent tension for the reel, all as and for the purpose set forth.

In testimony whereof I have hereunto subscribed my signature this the 17th day of November, A. D. 1899.

CHARLES STOOLFIRE.

Witnesses:
 SAMUEL S. WILLIAMS,
 WILLIAM E. JONES.